United States Patent [19]

Gordon et al.

[11] Patent Number: 4,951,805
[45] Date of Patent: Aug. 28, 1990

[54] FEED HOPPER WITH DISTRIBUTOR ELEMENTS

[75] Inventors: John Gordon, Bridgewater; Erich W. Sodtalbers, Washington, both of N.J.

[73] Assignee: Komline-Sanderson Engineering Corporation, Peapack, N.J.

[21] Appl. No.: 327,248

[22] Filed: Mar. 22, 1989

[51] Int. Cl.⁵ .............................................. B65G 47/19
[52] U.S. Cl. .................................. 198/525; 210/400; 210/405; 210/456; 209/269; 222/564
[58] Field of Search ............... 198/525; 193/2 R, 33; 222/564, 567; 210/400, 405, 456; 239/396, 398, 461, 590.5, 553.5; 209/244, 254, 269, 270, 267

[56] References Cited

U.S. PATENT DOCUMENTS

| | | | |
|---|---|---|---|
| 957,818 | 5/1910 | Traylor | 209/270 |
| 1,037,221 | 9/1912 | Dull | 209/254 |
| 2,236,378 | 3/1941 | Overstrom et al. | 209/269 X |
| 3,053,423 | 9/1962 | Mortara | 222/567 |
| 3,984,329 | 10/1976 | Wenzel et al. | 210/400 X |
| 4,556,172 | 12/1985 | Sugawara et al. | 239/590.5 |
| 4,602,998 | 7/1986 | Goron | 210/400 X |
| 4,609,467 | 9/1986 | Morales | 210/400 X |
| 4,718,531 | 1/1988 | Bianchi et al. | 193/2 R |

FOREIGN PATENT DOCUMENTS 1809876 6/1970 Fed. Rep. of Germany ...... 198/525

Primary Examiner—Robert J. Spar
Assistant Examiner—James R. Bidwell
Attorney, Agent, or Firm—Watson, Cole, Grindle & Watson

[57] ABSTRACT

A hopper assembly for uniform distribution of sludge, in which distribution elements on the bottom of the hopper are rotatable about vertical axes to enhance uniformity of distribution of the sludge issuing from the hopper.

14 Claims, 2 Drawing Sheets

FEED HOPPER WITH DISTRIBUTOR ELEMENTS

BACKGROUND OF THE INVENTION

1. Field of the Invention

The present invention relates generally to an apparatus for distributing liquid and semi-solid materials from a hopper through the open mouth thereof. More particularly, it relates to such apparatus in which sludge or similar material is deposited, and then uniformly distributed onto an endless filter medium.

2. Related Art

Sludge feed distribution hoppers are well known in the waste treatment industry. Typically, sludge is pumped through a pipe into a hopper, which is in alignment with the upper flight of an endless filter belt. The sludge flows from the mouth of the hopper, i.e., through one open end thereof, and is distributed across the width of the filter belt, hopefully in a fairly even manner.. However, because the sludge, itself, lacks uniformity, it is unlikely that distribution of the sludge within the hopper, and then from the hopper onto the filter belt, will be uniform.

Such lack of uniformity is a problem in the art. When sludge is deposited unevenly on a filter belt, dewatering of the sludge will be inconsistent: where the sludge is thickest, dewatering will be incomplete; where it is thinnest, dewatering ability will be wasted. It will be apparent that for any particular sludge and specific filter belt, maximum dewatering efficiency will depend on a predetermined thickness of the sludge. As a consequence, any deviation from the deposit of a uniform cake of sludge on a filter belt where the thickness of the cake varies from the predetermined optimum, will be derogatory to the dewatering process.

It will be apparent that in order to achieve deposit of a uniform filter cake on the filter belt, the sludge must issue from the mouth of the hopper in a uniform manner In order for this occurrence to take place, there must be a uniform build up of sludge within the hopper although, of course, it is not necessary, or even achieveable, that all of the sludge within the hopper will be at a uniform depth or distribution.

One problem that has been associated with the uniform distribution of sludge within the hopper is the presence of materials that differ substantially from the body of the sludge, e.g., rags or other fibrous materials may be present. Where such bulky materials are present, they may be caught somewhere within the body of the hopper, and sludge will tend to build-up behind and about the fibrous materials. After several hours of operation, this build-up can be quite substantial and reach a Point where the filter system will have to be shut down and cleaned. At the least, the presence of fibrous material in a sludge distribution hopper requires frequent operator attention.

SUMMARY OF THE INVENTION

The aforementioned difficulties and disadvantages attendant upon prior art sludge distribution systems may be overcome by means of a hopper assembly in which there are a plurality of sludge distributors mounted on the bottom wall of the hopper. Those sludge distributors should be placed at strategic locations in the hopper and be rotatable about their vertical axes. In this manner, when a rag or other fibrous material becomes "hung up" on one of the sludge distributors and unequal pressure is exerted on one side of the sludge distributor, the distributor will tend to rotate toward that side and, upon such rotation, free the fibrous material from the distributor.

There are a plurality of variations of our invention, which rely on various improvements and modifications of the sludge distributor elements Thus, the sludge distributor elements generally are mounted on the bottom of the hopper. While they need not be powered, and in an important embodiment of the invention should not be powered but be free to rotate axially in either direction, it is another feature of the present invention that such sludge distributors be rotated, by power means, preferably in a manner such that sludge will be distributed uniformly throughout the interior of the hopper and on the bottom pan thereof.

Finally, the sludge distributor elements can be made in various sizes and configurations. Where they are in the form of cylinders, the cylinders are rotatable about vertical spindles This form is preferred at present. However, the distribution elements can be concave, convex, and multi-fauceted, depending, upon the particular application to which they are to be placed. After experimentation with various types of sludges, they will be located on the bottom pan in a pattern that will maximize uniformity of the sludge that passes by the distribution elements.

It is another feature of our invention that the hopper assembly can be adjusted by well known means to increase or decrease the slope of feed from the back of the hopper, so that there is a slope in the bottom pan from the back of the splash guard of the hopper toward the front, open mouth thereof. In addition, the side-to-side elevation of the hopper assembly can be modified, also by conventional means, so that any lack of uniformity in issuance of sludge from the mouth of the hopper can be remedied by varying the side-to-side balance of the hopper.

These and other object, features and advantages of the present invention will become more apparent when considered in conjunction with the description of a preferred embodiment of the invention, in which FIG. 1 is a perspective view of the feed hopper and distribution assembly of the present invention;

FIG. 2 is a top plan view of the distribution assembly cf FIG. 1 showing the sludge flow pattern around the plurality of distribution elements in the hopper, and FIG. 3 is a side elevational view of the hopper assembly and sludge feed pipe showing the angle adjustments of the invention.

DETAILED DESCRIPTION OF PREFERRED EMBODIMENT

Figure 1:
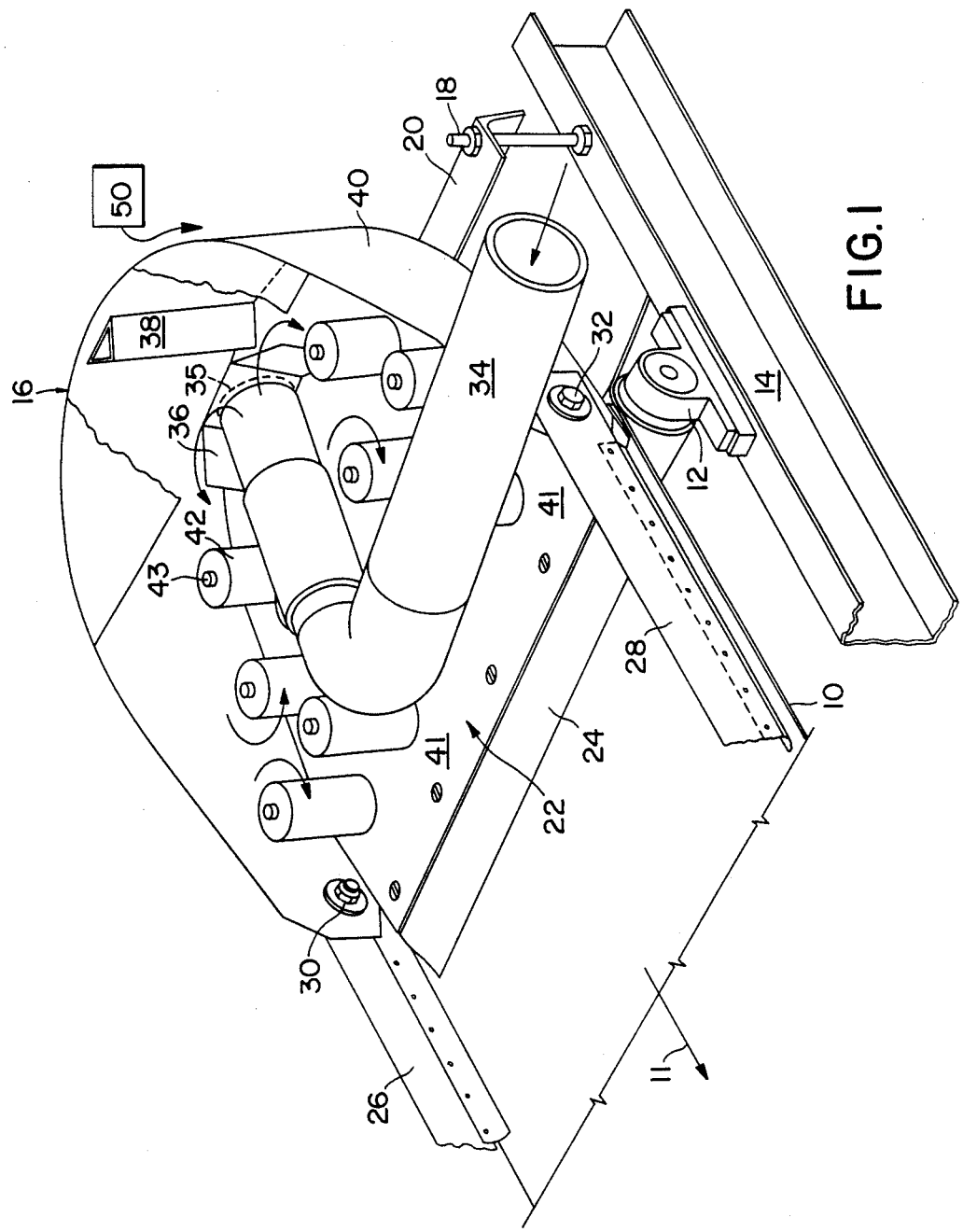

As shown in FIG. 1, endless filter belt 10 is trained about a roller mounted within journal 12, which is fixed on machine frame 14 so that endless belt 10 is driven in the direction of the arrow 11 in FIG. 1. Sludge feed hopper assembly 16 is mounted to machine frame 14 by adjusting screw 18 and plate member 20 such that the feed angle and side balance of the feed hopper assembly may be adjusted as more fully described hereinafter. The mouth or opening 22 of feed hopper assembly 16 includes transition seal member 24, which is in abutting relationship with the upper surface of endless filter belt 10 to prevent sludge from escaping between the mouth 22 and the top surface of endless filter belt 10. Side seals 26 and 28 respectively pivotally mounted to feed hopper assembly by pivot bolts 30 and 32, contain the sludge and Prevent it from spilling off the side of endless filter belt 10 in the region of the discharge of the sludge from feed hopper assembly 16 into endless filter belt 10.

Figure 2:
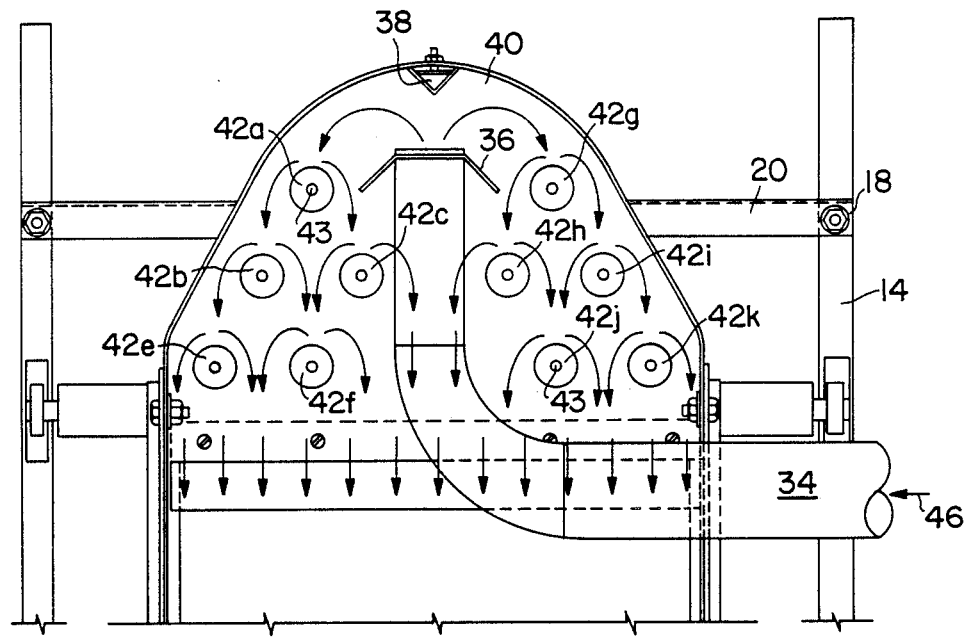

Feed pipe 34 is suspended in a conventional manner above sludge feed hopper 16 to discharge sludge into the feed hopper assembly as shown in FIG. 1. A sludge diverter plate 36 is mounted at the discharge end 35 of the sludge feed pipe 34 to divert the sludge issuing from the sludge pipe as generally shown in FIG. 2. Spreader 38 is optionally mounted to the feed hopper 16 opposite sludge opening 35 in the sludge feed pipe 34 to induce spreading of the sludge from splash guard 40 of the feed hopper, which is formed by the bottom 41 and splash guard 40.

An optional feed arrangement would include a feed pipe 44 entering the distribution hopper from the rear of the hopper in the same direction as movement of the filter belt 11.

Rotable sludge distributor elements 42a–42k are mounted within feed hopper 16, e.g., in the pattern illustrated in FIGS. 1 and 2. A typical sludge flow pattern is shown in FIG. 2 formed as the sludge flows from discharge opening 35 of sludge feed pipe 34 to the mouth 22 of the feed hopper assembly 16. The flow of the sludge past each of sludge diverter members 42a614 42k causes them to rotate about each of their respective mounting axes, which rotation assists the flow of sludge and prevents the build-up of sludge caused by the snagging of fibrous material in the sludge on the diverter elements.

With regard to the specific mounting of each distribution element, in the best mode of the invention illustrated, a spindle 43 is fixed by conventional means to the bottom wall 41 of the hopper. The spindles extend vertically, and are sized so that they can extend through a central orifice in each cylindrical distribution element 42. In this embodiment the distribution element 42 can rotate fully i.e., through at least a full 360° angle, about its associated spindle 43, either in a clockwise or counterclockwise direction according to the forces exerted on it.

In another, presently less preferred embodiment, the distribution element 42 is fixed to its spindle 43, and the spindle is rotatable in either direction by conventional power means, located beneath bottom wall 41. The conventional power means is shown in the drawing by a box 50. That power means will be connected to each of the spindles on which the sludge distributor members are mounted. The specific connections from the power means to the spindles, which are rotatable in conventional bushings, do not form part of the present invention, but will be readily apparent to those of skill in the art. Particularly when the sludge or other material being fed to the hopper is so fibrous that it will not readily pass by a distribution element, even one capable of rotation, power rotation of one or more of the distribution elements may be found advantageous.

Figure 3:
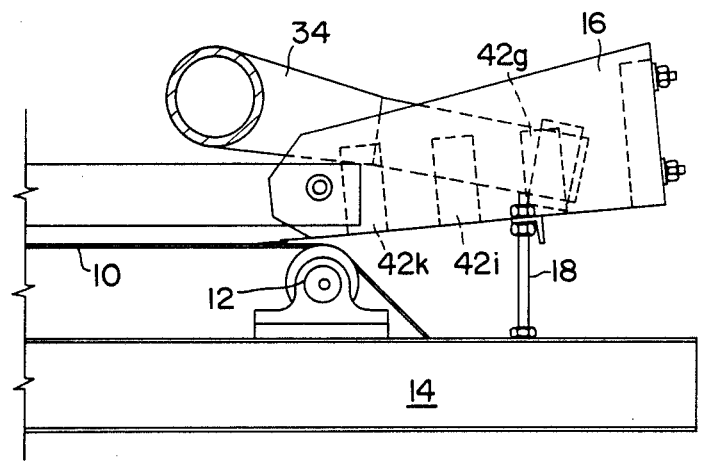

FIG. 3 shows a side elevational view of the feed hopper 16 and sludge feed pipe 34 with feed hopper assembly 16 being mounted at an elevated angle with respect to endless belt filter 10. The feed angle is adjustable by rotation of adjusting screw 18. Increased feed angles result in more rapid discharge of the sludge from feed hopper 16 through the open end 22 thereof, and lesser feed angles result in slower movement of the sludge. Side balance adjustment of feed hopper 16 is made possible by adjusting screw 18, or may be accomplished by other conventional means.

The above description is of exemplary embodiments of the invention. Thus, while the distribution elements have been indicated as cylindrical in shape, they may also have side surfaces that are convex, concave, or other shapes that are better adapted to specific sludges. As a consequence, we do not intend that our invention be confined to such embodiments, but that all obvious modifications and variations thereof be included within the purview of our invention, which is to be limited only by the scope, including equivalents, of the following, appended claims.

What is claimed is:

1. A hopper for the distribution of liquid or semi-solid materials therefrom, comprising a feed hopper assembly including a housing having a bottom and a splash guard extending around the periphery thereof, said bottom and splash guard together forming an opening at one end of said housing, and a plurality of distributor elements mounted on said bottom, said distributor elements during said distribution of materials from said housing being freely rotatable about their respective axes with regard to said bottom so that an imbalance of forces on a distributor element will cause that element to rotate in the direction of the greater force until the balance of forces on that element has been restored.

2. A hopper as claimed in claim 1, in which said material to be distributed from said hopper is sludge.

3. A hopper as claimed in claim 2, in which said sludge is sewerage sludge.

4. A hopper as claimed in claim 1, in which said distributor elements are cylindrically shaped.

5. A hopper as claimed in claim 1, in which said distributor elements are mounted for free rotation on a spindle that extends axially through said element.

6. A hopper as claimed in claim 1, further comprising means for adjusting the front-to-rear angle of said housing to vary the rate of flow of said material from said opening in said housing.

7. A hopper as claimed in claim 1, further comprising means for adjusting the side-to-side balance of said housing to adjust the uniformity of flow from said hopper.

8. A hopper as claimed in claim 1, in which said distributor elements are spaced from each other over a major portion of said housing bottom.

9. A hopper as claimed in claim 8, in which said distributor elements are mounted in spaced rows, each of said elements being spaced from at least one other of said elements in a row.

10. A hopper for the distribution of liquid or semi-solid materials therefrom, comprising a feed hopper assembly including a housing having a bottom and a splash guard extending around the periphery thereof, said bottom and splash guard together forming an opening at one end of said housing, a plurality of distributor elements mounted on said bottom, said distributor elements during said distribution of materials from said housing being rotatable about their respective axes with regard to said bottom, and power means for rotating said distributor elements through an angle of at least 360° to discharge therefrom fibrous or other materials which may accumulate on said distributor elements.

11. A hopper as claimed in claim 10, in which said power means for said distributor elements is actuable to rotate an element in a clockwise or counterclockwise direction.

12. A hopper as claimed in claim 10, in which said distributor elements are mounted on rotatable, vertical spindles and are rotatable with said spindles as said power means rotate same.

13. A hopper as claimed in claim 10, in which said distributor elements are spaced from each other over a major portion of said housing bottom.

14. A hopper as claimed in claim 13, in which said distributor elements are mounted in spaced rows, each of said elements being spaced from at least one other or said elements in a row.

* * * * *

UNITED STATES PATENT AND TRADEMARK OFFICE
CERTIFICATE OF CORRECTION

PATENT NO. : 4,951,805
DATED : August 28, 1990
INVENTOR(S) : John Goron It is certified that error appears in the above-identified patent and that said Letters Patent is hereby corrected as shown below:

ON TITLE PAGE: Items [19] and [75]

change "Gordon" to --Goron--.

Signed and Sealed this

Third Day of December, 1991

Attest:

HARRY F. MANBECK, JR.

*Attesting Officer*      *Commissioner of Patents and Trademarks*